United States Patent
Mades et al.

(10) Patent No.: US 12,247,568 B2
(45) Date of Patent: Mar. 11, 2025

(54) METHOD FOR DETECTING THE STATE OF OPERATION OF A ROTATING MACHINE

(71) Applicant: KSB SE & Co. KGaA, Frankenthal (DE)

(72) Inventors: Jochen Mades, Frankenthal (DE); Franz Bosbach, Frankenthal (DE); Tobias Klunke, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 441 days.

(21) Appl. No.: 17/271,838

(22) PCT Filed: Aug. 28, 2019

(86) PCT No.: PCT/EP2019/072955
§ 371 (c)(1),
(2) Date: Feb. 26, 2021

(87) PCT Pub. No.: WO2020/043772
PCT Pub. Date: Mar. 5, 2020

(65) Prior Publication Data
US 2021/0317832 A1    Oct. 14, 2021

(30) Foreign Application Priority Data

Aug. 28, 2018 (DE) .................. 10 2018 214 533.4
Aug. 27, 2019 (DE) .................. 10 2019 006 038.5

(51) Int. Cl.
*F04D 15/00* (2006.01)
*F04D 29/046* (2006.01)

(52) U.S. Cl.
CPC ....... *F04D 15/0077* (2013.01); *F04D 29/046* (2013.01)

(58) Field of Classification Search
None
See application file for complete search history.

(56) References Cited

U.S. PATENT DOCUMENTS

| | | | | |
|---|---|---|---|---|
| 4,460,893 A | * | 7/1984 | Thomas ................ | F16C 17/243 340/682 |
| 5,726,911 A | * | 3/1998 | Canada .................. | H02K 11/20 318/434 |
| 5,841,255 A | * | 11/1998 | Canada .................. | H02K 11/25 318/647 |

(Continued)

FOREIGN PATENT DOCUMENTS

| | | | |
|---|---|---|---|
| DE | 10 2004 040 899 A1 | 3/2006 | |
| DE | 10 2010 013 934 A1 | 10/2011 | |

(Continued)

OTHER PUBLICATIONS

Definition of Identify (Obtained from "https://dictionary.cambridge.org/us/dictionary/english/identify") (Year: 2024).*

(Continued)

*Primary Examiner* — Essama Omgba
*Assistant Examiner* — Geoffrey S Lee
(74) *Attorney, Agent, or Firm* — Crowell & Moring LLP

(57) ABSTRACT

A method for detecting the state of operation of a rotating machine, in particular a centrifugal pump, includes detecting using at least one first temperature sensor a change in temperature in or at least one bearing region of a rotating element of the rotating machine, identifying temperature gradients using an evaluation unit, from a temperature profile generated from the at least one temperature sensor, and identifying a switch-on and/or switch-off process of the rotational movement of the machine on the basis of a characteristic of the ascertained temperature gradient.

16 Claims, 3 Drawing Sheets

(56) References Cited

U.S. PATENT DOCUMENTS

| | | | | |
|---|---|---|---|---|
| 5,852,351 | A * | 12/1998 | Canada | H02K 11/35 |
| | | | | 702/56 |
| 5,952,803 | A * | 9/1999 | Canada | G01R 33/028 |
| | | | | 73/431 |
| 6,124,692 | A * | 9/2000 | Canada | H02K 11/20 |
| | | | | 318/490 |
| 6,260,004 | B1 * | 7/2001 | Hays | F04D 15/0088 |
| | | | | 702/183 |
| 6,297,742 | B1 * | 10/2001 | Canada | G07C 3/00 |
| | | | | 361/23 |
| 6,435,836 | B1 * | 8/2002 | Kobayashi | F04D 15/0263 |
| | | | | 417/32 |
| 8,782,922 | B2 * | 7/2014 | May | D06F 34/28 |
| | | | | 34/493 |
| 8,981,697 | B2 * | 3/2015 | Zeller | H02H 7/0822 |
| | | | | 318/432 |
| 2007/0201975 | A1 * | 8/2007 | Tisenchek | F02C 9/20 |
| | | | | 415/118 |
| 2012/0124859 | A1 * | 5/2012 | May | D06F 34/28 |
| | | | | 34/572 |
| 2015/0240459 | A1 * | 8/2015 | Kawasaki | E02F 9/267 |
| | | | | 701/50 |
| 2019/0301480 | A1 * | 10/2019 | Ojima | H02K 5/1675 |

FOREIGN PATENT DOCUMENTS

| | | | | |
|---|---|---|---|---|
| EP | 1 703 137 A2 | | 9/2006 | |
| EP | 4147615 A1 | * | 3/2023 | ............ A47J 27/004 |
| FR | 2821894 A1 | * | 9/2002 | ......... F04D 15/0218 |
| JP | 57-43537 A | | 3/1982 | |
| WO | WO-2019152959 A2 | * | 8/2019 | ......... F04D 15/0066 |

OTHER PUBLICATIONS

Machine Translation of EP4147615 (Obtained from USPTO Search Clarivate Analytics 2023) (Year: 2023).*

Machine Translation of FR2821894 (Obtained from USPTO Search Clarivate Analytics 2023) (Year: 2023).*

International Search Report (PCT/ISA/210) issued in PCT Application No. PCT/EP2019/072955 dated Nov. 19, 2019 with English translation (six (6) pages).

German-language Written Opinion (PCT/ISA/237) issued in PCT Application No. PCT/EP2019/072955 dated Nov. 19, 2019 (seven (7) pages).

German-language Search Report issued in German Application No. 10 2018 214 533.4 dated Jun. 19, 2019 with partial English translation (15 pages).

* cited by examiner

METHOD FOR DETECTING THE STATE OF OPERATION OF A ROTATING MACHINE

This application is a national phase of PCT International Application No. PCT/EP2019/072955, filed Aug. 28, 2019, which claims priority under 35 U.S.C. § 119 from German Patent Application No. 10 2018 214 533.4, filed Aug. 28, 2018, and German Patent Application No. 10 2019 006 038.5, filed Aug. 27, 2019, the entire disclosures of which are herein expressly incorporated by reference.

BACKGROUND AND SUMMARY OF THE INVENTION

The invention relates to a method for detecting the state of operation of a rotating machine, in particular a centrifugal pump, having a first temperature sensor for detecting a temperature change in or at at least one bearing region of a rotating machine element.

For the monitoring and maintenance of machines, it is desirable to be able to provide information relating to the operating time and also to switch-on and switch-off cycles of rotating elements which have taken place. On the basis of this information, the current wear and also the remaining service life of the machine, or of individual components, can be estimated. The simplest way is for the machine to collect corresponding information itself during operation and keep it available for external retrieval.

In practice, however, the necessary sensors for directly detecting the operating time or the switch-on and switch-off processes are not always available, either for cost reasons or because the invasive introduction of the sensors at corresponding measuring points is not always straightforward. An example here are sealed pumps, or wet-running pumps. For such special cases, it is already known to detect operating and stoppage times by means of measured machine vibrations. Vibration signals in the region of the machine are thereby evaluated. However, such an evaluation is not suitable for every machine because, depending on the field of use and the type of machine, the measurable vibrations are greatly influenced by the environment or the measurable vibrations are so small that only vague estimates are possible.

As an alternative to vibration measurement, it is already proposed in the prior art to use the measured machine temperature as an indicator of the current state of operation. However, previous implementations do not yet meet the demands in terms of quality and are therefore in need of improvement.

Accordingly, the aim of the present application is to optimize the last-mentioned solution in order to permit improved evaluation of the state of operation and in order optionally to be able to derive further findings from the evaluation.

According to the invention there is proposed a method for detecting the state of operation of a rotating machine. A rotating machine is understood as being any machine in which at least one machine element rotates about an axis of rotation relative to other machine components, as is the case, for example, with any rotary drive. The rotating component is here rotatably mounted on the other machine components via at least one bearing. Particular preference is given to the use of the method in a pump, in particular a centrifugal pump, which comprises a rotating pump shaft which is rotatably mounted in or on the pump casing via one or more bearings. However, the invention is in no way to be limited to a specific type of machine, but rather the fundamental idea according to the invention is applicable regardless of the type of machine.

An essential aspect of the invention consists in that there is used a first temperature sensor which is able to detect temperature changes during operation of the machine that are caused by the rotation of the rotating element, namely temperature changes that are the result of bearing friction, friction at gaskets and also the result of influences of the conveyed medium and/or of the environment. According to the invention, it is provided to detect a temperature change in the region of the bearing, that is to say in spatial proximity to the bearings, in particular at a surface close to the bearing. It is thus possible, on the basis of the recorded temperature signals, that is to say of the temperature measured by sensor, to detect temperature changes which are caused by the operation of the machine, with consideration of the ambient conditions. The temperature sensor usually measures the current temperature repeatedly and makes it available to the evaluation unit. From the individual measurements, a temperature profile is obtained. According to the invention, the evaluation unit no longer considers only simple temperature values, but instead a gradient evaluation of the recorded temperature profile is carried out. Specifically, the characteristic of any temperature rise or temperature drop is taken into account. On the basis of the specific characteristic, a switch-on or switch-off process of the machine can then be identified. It is of course also conceivable that parts of the logic of the evaluation unit are also carried out directly by the temperature sensor, so that, for example, the temperature sensor directly detects any temperature changes and outputs them to the evaluation unit. It is of course also possible for the evaluation unit to be wholly integrated into the temperature sensor.

The idea according to the invention is based on the inventors' observation that the temperature in the region of at least one bearing changes in dependence on the machine state. The possible temperature in or at the bearing region is of course dependent on the operating time and also on the machine load. However, detailed investigations by the inventors have shown that there can be a short-time, comparatively rapid temperature change at the time of the switch-on or switch-off process. By considering the gradient of the measurement profile, such a phenomenon can be identified and a corresponding switch-on or switch-off process can be detected.

Such a temperature change with a comparatively large gradient does not generally occur during normal continuous operation, that is to say temperature fluctuations that are customary in practice during continuous operation and also during load changes do not result in a comparable gradient. Against this background it is possible, on the basis of the consideration of the gradient, to achieve reliable detection of the current state of operation of the machine.

According to the method, the temperature is detected continuously or discontinuously with a defined measurement frequency or at specific measurement intervals. The temperature profile derived therefrom is subjected to a consideration of the gradient, wherein the focus is in particular on those gradients which show a prominent temperature change within a very short time, that is to say the gradient exceeds a defined minimum gradient, that is to say a minimum temperature change per unit time.

Preferably, the evaluation unit concludes that a switch-on and/or switch-off process of the rotational movement of the machine has taken place when the gradient under consideration exceeds a minimum value or lies within a defined value range. This corresponds to the preceding finding according to which a temperature change caused by a switch-on or switch-off process has a higher gradient than load-induced or operation-induced temperature changes. It is also conceivable here to define a plurality of minimum values (threshold values) or value ranges. For example, when a lower minimum value is exceeded, a switching process is identified, while a higher threshold value makes it possible to distinguish between a switch-on and a switch-off process, that is to say if the gradient under consideration also exceeds the upper threshold value, it is concluded, for example, that a switch-off process has been carried out.

Technically, this phenomenon can be explained by the fact that, after the rotational movement has been switched off, the operation-induced heating of the machine is not cooled by the air-mass flow caused during the rotational movement, so that the temperature increases initially and falls to a lower temperature, for example ambient temperature, only with a certain delay, because the machine has stopped. Similar behavior can be observed in the case of a switch-on process. Here, the machine is usually initially at the temperature level of the environment. If the rotation of the machine is activated, a cooling effect occurs owing to the air-mass movement that takes place, which brings about a short-time drop in the temperature in the bearing region, which manifests itself particularly clearly at the surface of the bearing support. The temperature level rises again only as the operating time increases, as a result of normal bearing friction. The effect of the above-mentioned phenomena during the switching process can be further enhanced if an additional fan is installed within the rotating machine, which provides a higher air-mass flow during the rotational movement for cooling any machine components but is switched off during stoppage times.

According to a preferred embodiment, the temperature at the bearing support, in particular at the surface of the bearing support, is detected by the first temperature sensor. For this purpose, the sensor can be mounted immediately in the region of the bearing, or on the bearing support. Mounting outside on the bearing support has the advantage that invasive intervention in the machine structure is not necessary, which is particularly important in the case of sealed centrifugal pumps. However, it is important for the positioning of the temperature sensor that operation-induced temperature changes, that is to say temperature changes caused by bearing friction, friction at gaskets or by the conveyed medium, can reliably be detected. On the other hand, it has been found to be disadvantageous to detect the temperature directly in the bearing by integrating the sensor directly into the bearing. In addition to an associated complex integration of a small and thus cost-intensive sensor, the temperature changes that are attributable to changes in the operating and/or ambient conditions cannot be detected with sufficient accuracy in the bearing. The advantage of the non-invasive measuring point, close to the bearing, according to the invention is that it can be implemented simply and inexpensively. A further advantage results from the finding that the temperature-change effects which arise in the case of a change in the operating conditions, such as connection and disconnection, occur more noticeably on the outside, in particular at the bearing support surface, than in the bearing itself. Ideally, the temperature is detected at a point of the bearing support that is accessible from outside, in particular at a surface of the bearing support.

The at least one minimum value, or the at least one defined range, for evaluating the gradient, in particular whether it characterizes a switch-on or switch-off process, must of course be defined machine-dependently. An important influencing factor is the machine size, or the proportion of thermally conductive material in the machine volume, since the higher the thermal conductivity, the better the heat can be dissipated and temperature changes compensated. Environmental influences are optionally also to be considered. A corresponding minimum value or minimum range is thus defined in dependence on the thermally conductive machine volume and also the specific geometry of the machine and/or the ambient conditions of the machine, wherein the limit value is reduced as the size/conductivity increases. An adaptive learning process performed by the evaluation unit for optimizing the one or more minimum values or ranges is conceivable here.

When considering the temperature profile, however, not only can the gradient provide information about the machine state, but the evaluation unit can likewise consider the sign of the gradient and also the magnitude of the maximum temperature change of the gradient under consideration, that is to say the temperature difference resulting from the gradient. The magnitude of the maximum temperature change and also the sign of the gradient can serve as an indicator in order to be able to distinguish between different switching processes, that is to say to be able to determine directly, on the basis of the gradient and independently of knowledge of the preceding machine state, whether the machine has been switched on or off. As explained above, the gradient for a switch-on process can initially have a negative sign owing to the short-term temperature drop, while the gradient of a switch-off process initially has a positive sign. The gradient value itself, that is to say the height of the detected gradient value, can also be considered in order to distinguish between a switch-on and a switch-off process, since a switch-off process, as has been determined by the inventors by experiment, shows a higher gradient value than a switch-on process.

The duration of the sustained maximum temperature change can likewise play a role since, as already described above, a rapid temperature change, caused by a switching cycle, within a very short time is followed by another temperature change in the opposite direction. Consideration of this behavior, that is to say the peak duration of the maximum temperature change, facilitates the reliable identification of the switching cycle.

It is further possible that the evaluation unit, on the basis of the magnitude of the maximum temperature changes and/or gradient height, not only identifies switching states but can likewise provide information about the current machine load and/or any wear phenomena on the machine. In particular, it can be assumed that a change in the maximum magnitude of the temperature change and/or the observed gradient magnitude compared to preceding switching cycles can represent an indication of a load change or increasing wear on the machine, in particular in the region of the bearing at which detection is carried out. For example, in the case of an increased load or in the case of increasing wear on the machine, in particular in the region of the bearing at which detection is carried out, there is an increase in the maximum magnitude of the temperature change and/or the observed gradient magnitude compared to preceding switching cycles, since bearing wear leads to increased bearing friction, which is reflected equally in the gradient and also the maximum bearing temperature. By contrast, in the case of a reduction of the machine load, there can also be a drop in the maximum magnitude of the temperature change and/or the observed gradient magnitude compared to preceding switching cycles.

In principle, a plurality of temperature sensors can be used to detect a temperature change originating from at least one bearing of a rotating machine element. It is of course thereby possible to use a plurality of sensors for each measuring point close to a bearing, that is to say a measuring point in or at the bearing region, but ideally one temperature sensor is used for each measuring point close to a bearing. The use of a plurality of temperature sensors can also be expedient for redundancy reasons, since the effect found by the inventors of course occurs at each measuring point, close to a bearing, for the rotating machine element. A further advantage of the use of one sensor for each installed bearing is that it is of course thus possible to monitor the wear of each individual bearing. The state and the current load of each bearing can thus be monitored.

According to an advantageous further development of the invention, it is possible to examine the temperature profile in the bearing region in relation to a further temperature parameter, in particular in relation to the current ambient temperature of the machine. Influences of the ambient temperature on temperature changes in the bearing region can thereby be filtered out. It is expedient, for example, to use at least one further temperature sensor which is positioned on the machine or in direct proximity to the machine and which detects the ambient temperature continuously. The temperature profile on which the gradient evaluation is based then preferably corresponds to the profile of the temperature difference between the measured temperature values, that is to say the difference between the temperature in the bearing region and the ambient temperature. Temperature changes in the temperature profile that are caused by changed ambient conditions can thereby be eliminated and the evaluation can be concentrated solely on machine-related temperature changes. It is likewise conceivable to consider and filter out further interfering influences by means of one or more further sensors. Such interfering influences include, for example, also the temperature of a medium flowing through the machine, in particular of the pumped medium in the case of pumps. Like the ambient temperature, the medium temperature could in this case also be detected, and the temperature difference between the bearing temperature and the medium temperature could be considered as the temperature profile. It is important when using a further temperature sensor that it is positioned on or outside the machine at a sufficient distance from the bearing/bearing support. Cooling down and heating up conditions of the environment can thus easily be detected.

With regard to this advantageous embodiment, it should be mentioned that the data relating to the ambient temperature, or medium temperature, or other interfering influences, that are provided do not necessarily have to come from a sensor provided for that purpose but can in principle also be retrieved from an information source of any kind, for example an information server.

According to a further embodiment of the method, a more advanced evaluation of the detected switch-on and switch-off processes is carried out. In particular, all the detected switch-on and switch-off cycles during a defined time period and/or the entire service life of the machine are to be counted. Further preferably, the actual operating phase between a switch-on process and a subsequent switch-off process can be detected. By summation of the individual operating times between two switching processes, the total operating time can additionally be detected. The same procedure can also be used for detecting stoppage times, by detecting an individual stoppage time between a switch-off process and a subsequent switch-on process. By means of summation, the total stoppage time of the machine can likewise be determined. The above-mentioned information can be detected and kept available within a memory of the evaluation unit for later retrieval. The one-time, periodic or random transmission of this information to at least one external receiver is also conceivable. Knowledge of the frequency and duration of stoppage times is important specifically in the case of drinking water pumps, since these have a tendency to stick during stoppage times.

The current temperature is detected repeatedly by the first and optionally the further temperature sensors with a specific measuring frequency. The measuring frequency can be statically as well as freely definable. It is conceivable to define the measuring frequency in dependence on the specific use conditions of the machine as well as in dependence on the type of machine, wherein here too the volume of the machine, or the volume of the thermally conductive components, influences the required measuring frequency. Generally, too low a measuring frequency has the risk that relevant gradients may possibly not be reliably detected. By contrast, an unnecessarily high measuring frequency requires the availability of large power and memory resources within the evaluation unit, so that, ideally, a compromise must be met in respect of the set conditions when choosing the measuring frequency.

Preferably, a dynamic setting of the measuring frequency could also take place, which ideally is set automatically by the evaluation unit in dependence on any parameters and/or measured values during ongoing machine operation and temperature detection. For example, the evaluation unit by default uses a predefined measuring frequency. If, however, a comparatively high gradient or a pronounced temperature rise is detected at a point of time in the procedure, the measuring frequency used for at least one of the sensors, preferably at least the first temperature sensor, is immediately and temporarily dynamically increased in order temporarily to increase the measurement accuracy at that point of time, which ultimately improves the reliable detection of the switch-on and switch-off process. It is likewise conceivable that the evaluation unit increases the measuring interval during ongoing operation for reasons of energy saving, that is to say reduces the measuring frequency. It is conceivable that the evaluation unit is configured for an initial short measuring interval. Such an initial measuring interval is in particular so chosen that, where possible, all rapid temperature gradients are reliably detected, where possible also machine-independently. If the evaluation unit, during ongoing operation, then identifies that reliable gradient identification and thus reliable detection of switching processes is ensured even with a greater measuring interval, the evaluation unit then adjusts the measuring interval a single time, stepwise or continuously to as optimal a value as possible, which on the one hand ensures reliable detection but on the other hand, owing to the reduced measuring operations, brings with it the desired energy saving.

In addition to the method according to the invention, the present invention relates also to a rotating machine, in particular a pump or a pumping set, preferably a centrifugal pump or centrifugal pumping set, having at least one evaluation unit for carrying out the method according to one of the preceding claims. The corresponding evaluation unit can be provided as an external unit, but as an alternative it can also be integrated within a normal pump controller. By means of at least one temperature sensor of the rotating machine, a corresponding measuring point, close to a bearing, on the rotating shaft of the pump impeller, in particular a measuring point on the bearing support surface, is monitored for any temperature changes and correspondingly evaluated.

In addition to the rotating machine, there is likewise protected a system consisting of a rotating machine having at least one temperature sensor and an external evaluation unit which is communicatively connected to the at least one temperature sensor and is configured to carry out the method according to the present invention.

Finally, the method can also be carried out by an intelligent temperature sensor which is suitable for mounting on at least one rotating machine, in particular in or at the bearing region. Such a temperature sensor has an integral evaluation unit which is configured to carry out the method according to the invention. Accordingly, the same advantages and properties as have already been indicated above with reference to the method according to the invention apply both to the rotating machine and also to the system and the temperature sensor. A repeat description will therefore not be given at this point.

Other objects, advantages and novel features of the present invention will become apparent from the following detailed description of one or more preferred embodiments when considered in conjunction with the accompanying drawings.

DETAILED DESCRIPTION

For detecting the switching times of a rotating machine, in particular of a pumping set, the inventors have identified three important characteristic features for which the recorded measured data of one or more temperature sensors can be examined.

1. A short-time drop/gradient of the temperature measured in the bearing region, or at the bearing support, which indicates that the set has been switched on.

2. A short-time rise/gradient of the temperature measured in the bearing region, or at the bearing support, which indicates that the set has been switched off.

3. Number and size of the gradients of the temperature measured in the bearing region, or at the bearing support, with respect to the ambient temperature of the machine.

Figure 1:
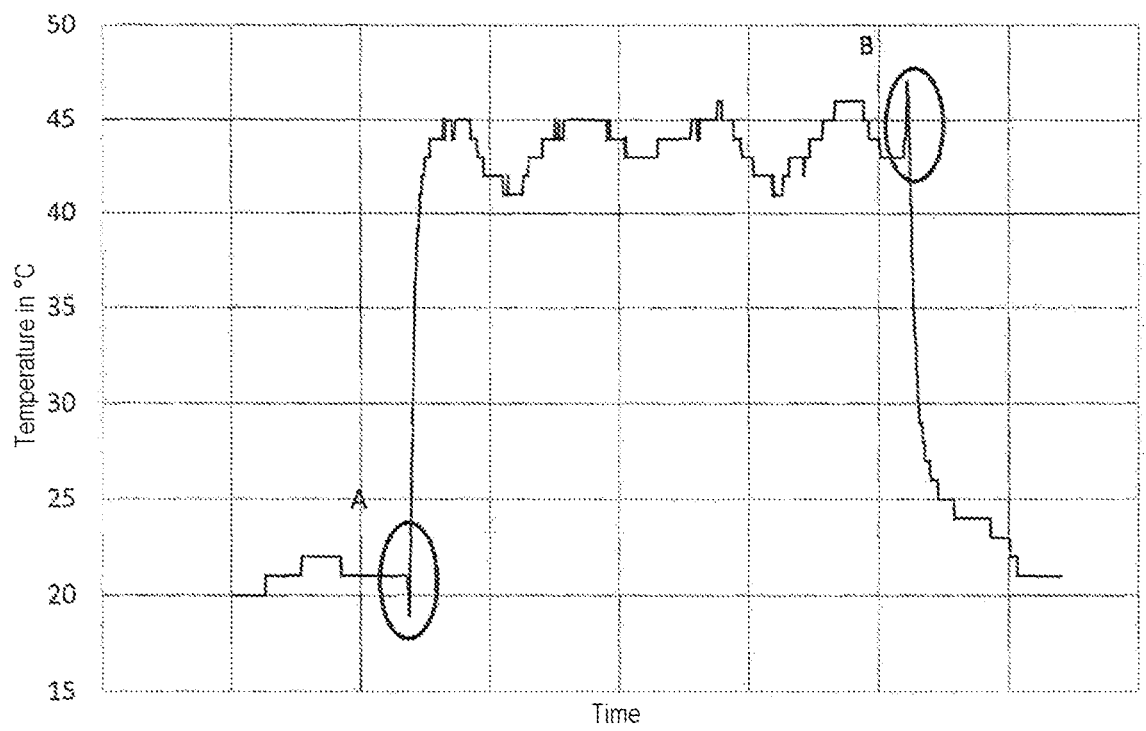
FIG. 1 shows a diagram which shows the temperature profile, detected by sensor, over time in the region of the bearing support of a rotating machine (here a centrifugal pump) in accordance with an embodiment of the present invention.

In order to explain features 1 and 2, reference is made to the diagrammatic representation of FIG. 1. The diagram shows the temperature measured at the bearing support, more precisely at the surface thereof, of a centrifugal pump over time. Position A marks a short-time negative temperature peak, which shows a short-time drop in the temperature in the region of the bearing of the machine. This phenomenon occurs as a result of the fact that, when the pump drive is started up, an air-mass flow is generated, which brings with it a cooling effect on the bearing or the bearing support. This cooling effect is additionally enhanced by a fan of the electric motor of the pump drive. This ultimately leads to delayed, friction-induced heating of the bearing support.

It will be seen in the diagrammatic representation that the characteristic of this peak at position A differs significantly from the remainder of the temperature profile, in particular the gradient of the temperature profile is significantly greater than in the case of the preceding temperature fluctuations and the subsequent temperature fluctuations between position A and position B. These temperature fluctuations are caused by external influences (for example ambient temperature) and also operation-related influences such as load changes.

The gradient at position A is thus evaluated by the evaluation unit of the pump as a clear indication of a switch-on process of the pump drive.

At the marked position B, by contrast, a short-time rapid rise in the measured temperature at the bearing support is to be seen. Such behavior occurs immediately after the pump drive has been switched off, since the cooling air-mass flow decreases or stops completely as a result of the absence of rotational movement, so that the operating temperature of the bearing/pump initially leads to a short-time rapid temperature increase of the bearing support, and cooling of the bearing support, or of the machine, to ambient temperature occurs only with a certain delay. The gradient marked at position B also differs significantly from the other gradients of the usual temperature fluctuations, so that here too, the evaluation unit can definitely conclude that a switch-off process has taken place.

In the present case, the evaluation unit can distinguish the detected gradients at positions A, B from one another on the basis of the gradient sign and also on the basis of the maximum magnitude of the temperature change, that is to say the peak height, in order thus to be able to definitely allocate the gradients to a switch-on or switch-off process of the machine. Specifically, the gradient for a switch-on process at position A is initially negative, until a sign change occurs owing to the delayed temperature increase induced by bearing friction. By contrast, the gradient in the case of the switch-off process is initially positive, and the sign change then occurs with the delayed cooling of the machine as a result of the machine being stopped.

Figure 2A:
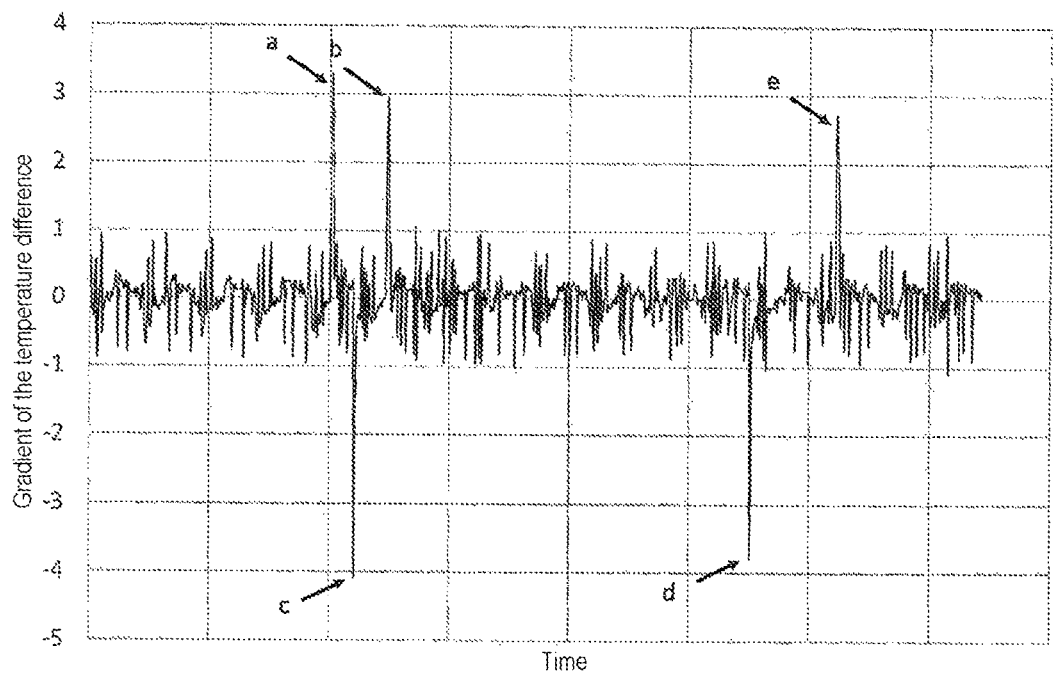
FIG. 2 shows two further diagrammatic representations which show the gradient profile of a temperature difference over time in accordance with an embodiment of the present invention.

An extended solution of the invention will be explained with reference to the diagrammatic representation of FIGS. 2a, 2b. In FIG. 2a, the gradients of a temperature difference profile over time are plotted. Specifically, in this example the ambient temperature of the machine is detected at the same time as the bearing temperature, and a difference is formed from the two temperature values. The gradient profile shown according to FIG. 2a is then determined from this profile of the temperature difference over time. By means of this measure, heating at the bearing support can be determined largely without environmental influences and evaluated.

Here too, use is made in the evaluation of the above-described phenomena that characteristic temperature gradients are present during a switch-on and switch-off process, which are detected by the evaluation unit and used as an indicator for detecting a switch-on or switch-off process. In FIG. 2a, a total of five such characteristic gradients can be seen, which are distinguished by a significantly higher value of the gradient compared to gradients in the case of load- or time-induced temperature fluctuations. These gradients are marked by points a-e, wherein positions a, b, e carry a positive sign while gradients c, d are negative. In conjunction with features 1, 2 described above and with consideration of the size of the gradients a-e, it is possible to identify whether the machine has been switched on or off.

Figure 2B:
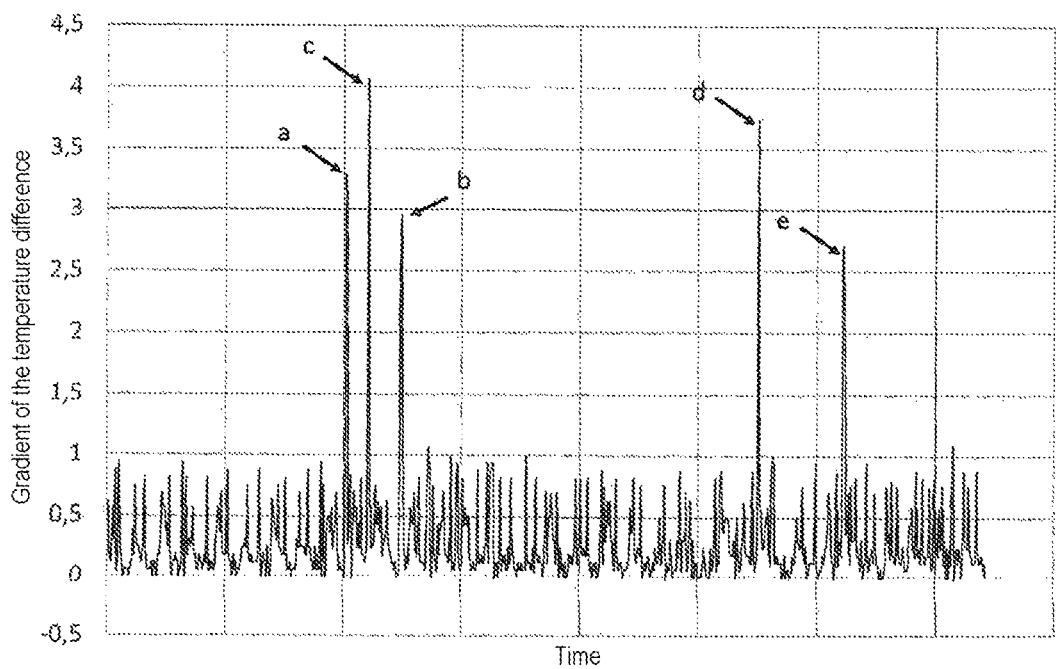

For better comparability, only the gradient magnitude is considered, that is to say a sign reversal is carried out for the negative gradients, which is shown in FIG. 2*b*. FIG. 2*b* now clearly illustrates that gradients c, d are higher than gradients a, b and e. Considering the preceding explanations, according to which higher gradients are present in the case of a switch-off process, the evaluation unit can now determine that gradients c, d indicate switch-off processes while gradients a, b, e stand for switch-on processes.

For the further evaluation of the operating times of the centrifugal pump, the detected gradients a-e are then counted, in order thus to be able to determine the number of switching processes which have taken place. With knowledge of the number of switching processes of a machine, it is then possible also to determine the operating and stoppage times of the machine.

The different procedures for switching process identification on the basis of FIG. 1 and FIGS. 2*a*, 2*b* can of course also be combined with one another in order further to optimize the quality of the detection.

Figure 3:
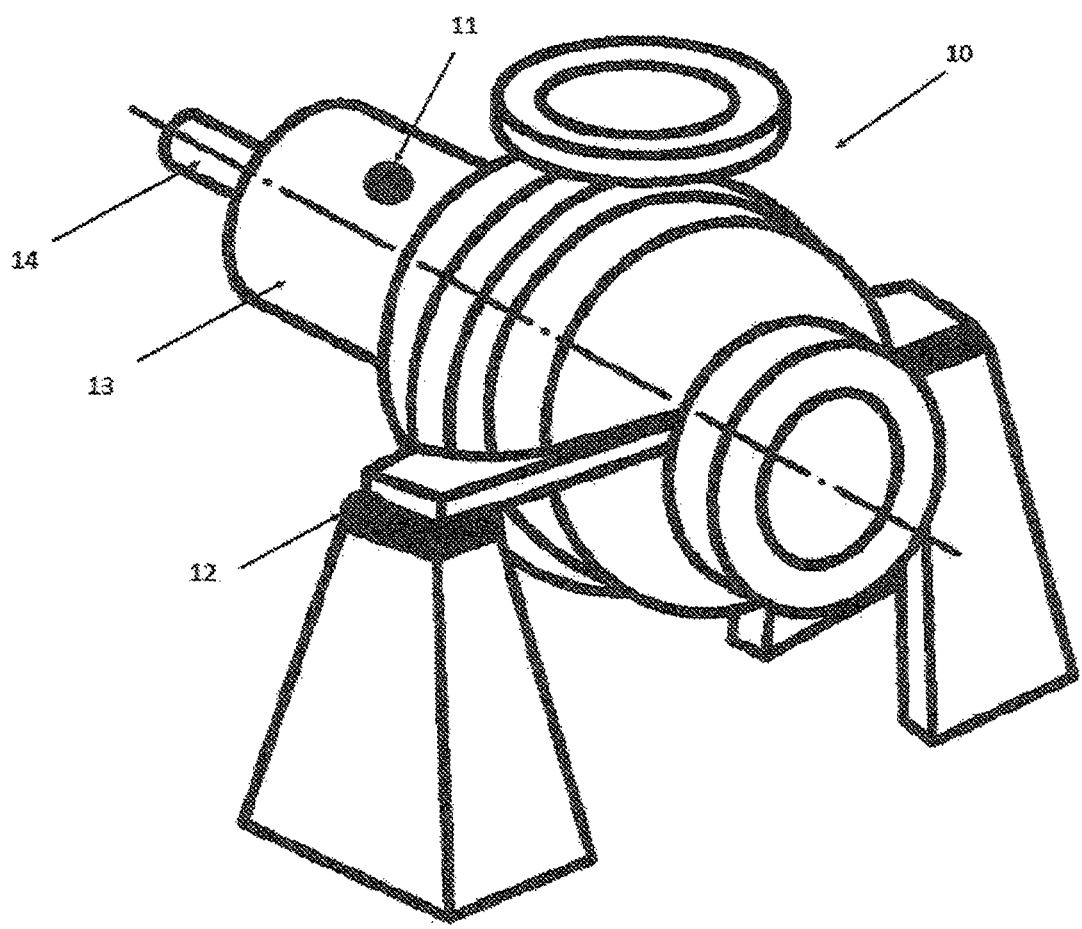
FIG. 3 shows a schematic representation of a centrifugal pump in accordance with an embodiment of the present invention in which possible mounting points for the mounting of a temperature sensor for detecting the bearing temperature and the ambient temperature are marked.

FIG. 3 shows, schematically, a rotating machine in the form of a centrifugal pump 10. The centrifugal pump 10 comprises a rotating shaft 14 which on the one hand receives the pump impeller and on the other hand is driven by the pump drive. The shaft is rotatably mounted by means of at least one bearing, wherein the bearing is seated within the bearing support 13 shown. The rotation of the shaft causes bearing friction, which leads to heating of the machine 10 and in particular of the bearing support 13. For the method according to the invention, the temperature in the region of the bearing, in particular at the surface of the bearing support, is then detected.

In principle, the temperature of the bearing support 13 can be measured at any desired points. Preference is given, however, to a measurement as close as possible to the bearing point, that is to say at a surface, close to the bearing, of the bearing support, in order to be able to provide precise information about the temperature development caused by bearing friction. A potential measuring point for the temperature of the bearing support is marked with reference numeral 11.

Measurement of the ambient temperature should preferably be carried out at a sufficient distance from comparatively hot or cold components of the machine, but nevertheless in the immediate vicinity of the machine. FIG. 3 also shows a potential measuring point for the ambient temperature with reference numeral 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting the state of operation of a rotating machine having at least one first temperature sensor for detecting a temperature change at at least one bearing region of an element of the rotating machine element and an evaluation unit, comprising the steps of:
   sensing a temperature profile at the at least one bearing region using the at least one first temperature sensor;
   identifying using the evaluation unit a sign, and magnitude of a maximum temperature change, of temperature gradients in the temperature profile; and
   identifying using the evaluation unit, from the sign, and the magnitude of the maximum temperature change, of the temperature gradients, at least one of a switch-on event and a switch off event of rotational movement of the rotating machine, wherein
   the at least one first temperature sensor is mounted on a bearing support.

2. The method as claimed in claim 1, wherein the rotating machine is a centrifugal pump.

3. The method as claimed in claim 2, wherein the at least one of the switch-on and the switch off events is identified based on a characteristic of respective ones of the temperature gradients.

4. The method as claimed in claim 3, wherein the at least one bearing region includes a bearing support, and
a temperature of the bearing support is sensed by the at least one first temperature sensor at the bearing support.

5. The method as claimed in claim 4, wherein the temperature of the bearing support is sensed at a location at the bearing support that is accessible from outside the centrifugal pump.

6. The method as claimed in claim 5, wherein the temperature gradient characteristic is a temperature change magnitude, and
the evaluation unit identifies the at least one of the switch-on and the switch off events has taken place when the temperature change magnitude is greater than a minimum value or is within a temperature change magnitude range.

7. The method as claimed in claim 6, further comprising the step of:
   determining dynamically using the evaluation unit the temperature change magnitude minimum value or range while the centrifugal pump is operating, based on a thermally conducting volume of the centrifugal pump.

8. The method as claimed in claim 6, further comprising the step of:
   determining using the evaluation unit a duration of a maximum temperature change.

9. The method as claimed in claim 8, further comprising the step of:
   identifying using the evaluation unit at least one of a load change and a wear state of the centrifugal pump based on a magnitude of the maximum temperature change.

10. The method as claimed in claim 2, further comprising the step of:
    determining using the evaluation unit a temperature difference between the first temperature sensor and at least one further temperature sensor.

11. The method as claimed in claim 10, wherein the at least one further temperature sensor detects at least one of an ambient temperature of the centrifugal pump and a temperature of a medium flowing through the centrifugal pump.

12. The method as claimed in claim 2, further comprising the step of:
    determining using the evaluation unit a count of the identified switch-on and the switch off events, and
    determining using the evaluation unit at least one of operating times and stoppage times of the centrifugal pump.

13. The method as claimed in claim 10, wherein the evaluation unit dynamically adjusts the measuring frequency of at least the first temperature sensor when at least one of a minimum temperature change threshold and a minimum temperature gradient is exceeded.

14. A rotating machine, comprising:
a centrifugal pump; and
at least one evaluation unit configured to execute the identifying steps of the method as claimed in claim 1.

15. A temperature monitoring system, comprising:
a rotating machine;
at least one temperature sensor associated with the rotating machine; and
an external evaluation unit in communication with the at least one temperature sensor,
wherein the external evaluation unit is configured to carry out the identifying steps of the method as claimed in claim 1.

16. A temperature monitoring system, comprising:
a temperature sensor configured to be mounted on at least one rotating machine; and
an integral evaluation unit at the temperature sensor configured to carry out the identifying steps of the method as claimed in claim 1.

* * * * *